(12) United States Patent
Christensson et al.

(10) Patent No.: US 8,099,902 B2
(45) Date of Patent: Jan. 24, 2012

(54) SENSOR ARRANGEMENTS, SYSTEMS AND METHOD IN RELATION TO AUTOMATIC DOOR OPENERS

(75) Inventors: Lennart Christensson, Limhamn (SE); Lars Holmqvist, Lund (SE); Henrik Larne, Lund (SE)

(73) Assignee: Secumanagement B.V., Leidschendam (NL)

( * ) Notice: Subject to any disclaimer, the term of this patent is extended or adjusted under 35 U.S.C. 154(b) by 1020 days.

(21) Appl. No.: 10/561,181

(22) PCT Filed: Jun. 16, 2004

(86) PCT No.: PCT/SE2004/000946
§ 371 (c)(1),
(2), (4) Date: May 22, 2006

(87) PCT Pub. No.: WO2004/111374
PCT Pub. Date: Dec. 23, 2004

(65) Prior Publication Data
US 2006/0244403 A1 Nov. 2, 2006

Related U.S. Application Data

(60) Provisional application No. 60/478,341, filed on Jun. 16, 2003.

(51) Int. Cl.
*E05F 15/20* (2006.01)
(52) U.S. Cl. ........................................................ 49/25
(58) Field of Classification Search . 49/25; 340/825.69, 340/825.37, 825.36, 542, 500; 348/140, 348/142, 143, 156; 725/9, 11–20
See application file for complete search history.

(56) References Cited

U.S. PATENT DOCUMENTS

| | | | | |
|---|---|---|---|---|
| 5,097,454 A | * | 3/1992 | Schwarz et al. | 367/93 |
| 5,541,585 A | * | 7/1996 | Duhame et al. | 340/5.62 |
| 6,023,224 A | * | 2/2000 | Meyvis | 340/545.1 |
| 6,061,056 A | * | 5/2000 | Menard et al. | 715/704 |
| 6,097,429 A | * | 8/2000 | Seeley et al. | 348/154 |
| 6,205,233 B1 | * | 3/2001 | Morley et al. | 382/103 |
| 6,298,603 B1 | * | 10/2001 | Diaz | 49/68 |
| 6,810,256 B2 | * | 10/2004 | Stuempert et al. | 455/439 |
| 7,042,492 B2 | * | 5/2006 | Spinelli | 348/143 |
| 7,203,337 B2 | * | 4/2007 | Heyden | 382/103 |
| 2001/0030689 A1 | | 10/2001 | Spinelli | |
| 2002/0071033 A1 | | 6/2002 | Gutta et al. | |

(Continued)

FOREIGN PATENT DOCUMENTS

| | | |
|---|---|---|
| EP | 0803632 A1 | 10/1997 |
| EP | 0852313 A1 | 7/1998 |
| JP | 6-201715 A | 7/1994 |
| JP | 2002-304651 A | 10/2002 |

(Continued)

*Primary Examiner* — Jerry Redman
(74) *Attorney, Agent, or Firm* — Birch, Stewart, Kolasch & Birch, LLP

(57) ABSTRACT

A sensor arrangement controls opening and closing of a door device. The sensor arrangement is arranged to be mounted in the vicinity of the door device. The sensor arrangement comprises an image-acquiring means, which monitors and acquires images of a field of view that encompasses at least an approach area located adjacent said door device, and a movement detector, which is arranged to process the acquired images in order to detect a movement, which is to result in an opening of the door device. The sensor arrangement also comprises an event generator, which is arranged to process information regarding the door device and said field of view in order to identify at least one event according to predetermined criteria, wherein the event generator in response to an identification of an event creates a recording of the event.

9 Claims, 11 Drawing Sheets

U.S. PATENT DOCUMENTS

| | | | |
|---|---|---|---|
| 2002/0167403 A1* | 11/2002 | Colmenarez et al. | 340/541 |
| 2004/0004542 A1* | 1/2004 | Faulkner et al. | 340/506 |
| 2004/0114036 A1* | 6/2004 | Karaoguz et al. | 348/142 |
| 2005/0086688 A1* | 4/2005 | Omoigui | 725/35 |
| 2007/0024708 A1* | 2/2007 | Lin et al. | 348/143 |
| 2008/0309759 A1* | 12/2008 | Wilson et al. | 348/143 |
| 2009/0059001 A1* | 3/2009 | Wang | 348/143 |
| 2009/0195382 A1* | 8/2009 | Hall | 340/541 |

FOREIGN PATENT DOCUMENTS

| | | |
|---|---|---|
| JP | 2003-023699 A | 1/2003 |
| JP | 2003-027796 A | 1/2003 |
| JP | 2003-085661 A | 3/2003 |
| JP | 2003-125384 A | 4/2003 |
| WO | WO-01/42120 A1 | 6/2001 |
| WO | WO-02-44505 A1 | 6/2002 |

* cited by examiner

SENSOR ARRANGEMENTS, SYSTEMS AND METHOD IN RELATION TO AUTOMATIC DOOR OPENERS

This National Phase PCT application claims priority under 35 U.S.C. 119(e) on U.S. Provisional Application No(s). 60/478,341 filed on Jun. 16, 2003 all of which are hereby incorporated by reference.

TECHNICAL FIELD

The present invention relates to a sensor arrangement for controlling opening and closing of a door device. The present invention also relates to a method in such a sensor arrangement, a system for controlling a device for opening and closing of a door device, and a system for managing a plurality of door sensor arrangements.

BACKGROUND ART

Automatic door openers are used to a large extent in i.a. shopping centres and public buildings to facilitate and speed up passage through an entrance or exit provided with a door. This is especially useful for elderly or handicapped persons.

Today, automatic opening and closing of a door is typically controlled by microwave Doppler or active and passive infrared sensors, which detect the motion of a person approaching the door. These sensors merely detect a movement and will not be able to distinguish between different objects approaching the door.

There may be a need for a more intelligent controller of the automatic opening and closing of doors. In US Patent Application Publication No. 2001/0030689, there is disclosed a video image device controlling the opening and closing of a door. Here, a person approaching the door is detected by comparing images of a field of view in front of the door. By using a video image device, the movement of a person could be distinguished from the movement of e.g. a piece of paper blowing in the wind. Thus, the door will not be opened upon detection of any movement, but may be opened only when a person actually approaches the door.

When a more intelligent controller of a door is used, the door will not be opened or held open unless necessary. However, this increases the risk of a person being injured by incorrect opening or closing of the door. Thus, there is a need for an improved handling of detections in an intelligent controller of automatic opening and closing of a door.

SUMMARY OF THE INVENTION

An object of the invention is to provide an improved sensor arrangement for controlling opening and closing of a door device. Another object of the invention is to provide an improved handling of detections made by the sensor arrangement.

According to an aspect of the invention, these and other objects of the invention are achieved by means of a sensor arrangement for controlling opening and closing of a door device. The sensor arrangement is arranged to be mounted in the vicinity of the door device and comprises an image-acquiring means, which is arranged to be mounted in a viewing position wherein said image-acquiring means monitors a field of view that encompasses at least an approach area located adjacent said door device. The image-acquiring means is adapted to acquire images of said field of view. The sensor arrangement further comprises a movement detector, which is arranged to receive said acquired images. The movement detector is arranged to process the received images in order to detect a movement, which is to result in an opening of the door device. The sensor arrangement also comprises an event generator, which is arranged to receive information regarding said door device and said field of view, said information comprising said acquired images. The event generator is arranged to process said information in order to identify at least one event according to predetermined criteria, wherein the event generator in response to an identification of an event creates a recording of the event.

According to another aspect of the invention, there is provided a method in a sensor arrangement for controlling opening and closing of a door device, said sensor arrangement being mounted in the vicinity of the door device. The method comprises acquiring information regarding said door device and an area adjacent said door device, said information comprising images of a field of view that encompasses at least an approach area located adjacent said door device; processing said information in order to identify at least one event according to predetermined criteria; and in response to an identification of an event, creating a recording of the event.

As used herein, the phrase "sensor arrangement for controlling opening and closing of a door device" should be construed as a sensor arrangement that does not necessarily perform opening and closing of a door device, but may instead provide signals or information to a door controller for the opening and closing of the door device. However, the sensor arrangement may also directly control the opening and closing of the door device.

Further, the term "event" should be construed as any occurrence that changes the conditions of the door device or the field of view. Such occurrence may, for example, be a movement within the field of view, a change of the background in the field of view, a change of the settings of the image-acquiring means, or a change of the position of the door device. Certain events have been predefined according to some criteria. The event generator will process the acquired images in order to identify if such an event has occurred. If such an event occurs, the event generator creates a recording of the event. The term "recording" should be construed as a packet of data holding information about the event. The recording may be stored temporarily or permanently in the sensor arrangement.

Moreover, the term "information regarding said door device and said field of view" may include information provided by acquired images of the field of view and may also include information provided in other ways, such as information from a motor that opens and closes the door device and information from a door position sensor on the current position of the door device.

Since the sensor arrangement according to the invention records events, there is provided a possibility of handling dangerous or exceptional situations in a specific manner. Further, the sensor arrangement may merely record certain events, whereby information of normal, uninteresting situations may be discarded. This implies that an operator may be noticed when an event occurs. Thus, there is no need of constantly watching the operation of the automatic opening and closing of the door. Moreover, since events are recorded, there is a possibility of logging the recordings. The log may be used by a door owner to monitor how often and at what times exceptional events occur. In this way, the log may be used to improve function of the door device, whereby the safety of the door device is improved. Further, in case of an accident, the installation firm may use the log to prove that the sensor arrangement was correctly installed or that it was incorrectly used.

According to an embodiment, the sensor arrangement further comprises a communication unit, which is arranged to transmit said recording of the event over a data network to which the sensor arrangement is connected. Thus, the recording may be transmitted to a remote site for handling the recording. This implies that an operator or service person may control the function of the door device from a remote position, increasing efficiency and reducing travelling costs. Further, if the recordings are transmitted to a remote site, there is no need for a large memory capacity in the sensor arrangement.

The sensor arrangement may be a unitary structure. This makes the sensor arrangement easy to handle and makes it less sensitive to interferences. Further, the sensor arrangement will have fewer points on which sabotage or malfunctions may occur. Moreover, the amount of data to be transmitted is small, since the data is first processed within the sensor arrangement, and then only selected data is forwarded over a data network.

According to another embodiment, the event generator is arranged to receive information from a door position sensor regarding position and/or speed of said door device. Thus, the acquiring of information may comprise acquiring information regarding speed and position of the door device. This implies that the function of opening and closing the door device is also monitored. Therefore, defective function of the door device may also be identified and recorded.

The recording may include associated information regarding said event, wherein a predefined specification determines what associated information is to be included in a recording. This implies that specific information may be associated with each event. Thus, the recording of an event may be customized for each specific event. This is very suitable, since different information may be needed for different types of events.

The recording may include at least one image of said field of view. The image may then be used for purposes of proving what has actually occurred at the door device when the event was recorded.

According to yet another embodiment, the at least one event to be identified by the event generator includes at least one event that permanently changes the settings of the field of view that is monitored by the image-acquiring means. If the settings are changed, the detection of a person approaching the door may be impaired. Therefore, the sensor arrangement advantageously identifies such changes.

The event generator may be arranged to process the received images in order to identify a plurality of different events according to different predetermined criteria. Thus, several different events may be specified, which the sensor arrangement should be able to identify. This improves the function of the sensor arrangement.

According to yet another aspect of the invention, there is provided a system for controlling a device for opening and closing of a door device, said system comprising a sensor arrangement being arranged to be mounted in the vicinity of the door device. The sensor arrangement comprises an image-acquiring means, which is arranged to be mounted in a viewing position wherein said image-acquiring means monitors a field of view that encompasses at least an approach area located adjacent said door device, said image-acquiring means being adapted to acquire images of said field of view; and a movement detector, which is arranged to receive said acquired images and which is arranged to process the received images in order to detect a movement, which is to result in an opening of the door device. The sensor arrangement further comprises an event generator, which is arranged to receive information regarding said door device and said field of view, said information comprising said acquired images, said event generator being arranged to process said information in order to identify at least one event according to predetermined criteria, wherein the event generator in response to an identification of an event creates a recording of the event. The system further comprises a computer unit being connected to the sensor arrangement for receiving recordings of events identified by the sensor arrangement and handling said recordings.

The system provides a possibility of firstly recording events in the sensor arrangement and then handling the recordings in the computer unit. Thus, there is a low traffic of data between the sensor arrangement and the computer unit, since only the information to be used by the computer unit, i.e. the recordings of events, is transmitted to the computer unit. Further, handling of the recordings, such as adjusting and sorting the recordings, is easily made at the computer unit.

According to an embodiment, the computer unit is connected to a display device for displaying recordings of events to an operator of the device for controlling opening and closing of the door device. Thus, the recordings may be presented in a suitable manner to the operator.

According to another embodiment, the computer unit is arranged to store recordings of events in a log. This implies that the information on events is preserved and may be used at a later stage for e.g. analysing the performance of the door device or, in case of an accident, proving that the sensor arrangement was correctly installed or that it was incorrectly used.

According to still another aspect of the invention, there is provided a sensor arrangement for controlling opening and closing of a door device. The sensor arrangement is arranged to be mounted in the vicinity of the door device and comprises an image-acquiring means, which is arranged to be mounted in a viewing position wherein said image-acquiring means monitors a field of view that encompasses at least an approach area located adjacent said door device. The image-acquiring means is adapted to acquire images of said field of view. The sensor arrangement further comprises an event generator, which is arranged to process information regarding said door device and said field of view in order to identify at least one event according to predetermined criteria. The event generator creates a recording of the event in response to an identification of an event, said recording comprising at least one image of the field of view.

According to this aspect of the invention, there is provided a possibility of identifying dangerous or exceptional situations at the door device in a specific manner. Further, the sensor arrangement creates recordings of events, enabling logging and analysing the performance of the door device. Moreover, the recordings will include an image of the field of view, which may be used for proving what actually happened in the field of view at the time of the occurrence of the event.

According to a further aspect of the invention, there is provided a system for managing a plurality of door control arrangements that are arranged to control the opening and closing of a corresponding plurality of door devices. The system comprises a plurality of image sensors, each being arranged for mounting in a viewing position to acquire images of a field of view adjacent to one of said door devices; a plurality of movement detectors, each being arranged to receive said images from at least one of said image sensors and to issue an activation signal to one of said door control arrangements, based on detection of an object approaching said door device in at least one of said images; at least one event generator, which receives and processes said images to identify at least one event according to predetermined criteria and creates a recording of such an identified event; at least one event storage, which stores said recordings created by said at least one event generator; and at least one network connection unit, which connects said at least one event storage to a communication network, thereby making said recordings accessible to an external computer, via said communication network and said network connection unit, for management of said door control arrangements.

According to this aspect of the invention, the operation of a plurality of door devices may be monitored at a remote location. Similarly, it may be possible to monitor the operation of the image sensor and/or the movement detector and/or the event generator, as well as reconfigure the same. This aspect also allows events, occurring locally at the door devices, to be logged at a remote location, in a local or central management unit, for later review or analysis. Apparently, the system provides improved handling of detections and efficient management of the door control arrangements.

BRIEF DESCRIPTION OF THE DRAWINGS

The invention will now be described in further detail by way of example under reference to the accompanying drawings, on which.

DETAILED DESCRIPTION OF A PRESENTLY PREFERRED EMBODIMENT

Figure 1:
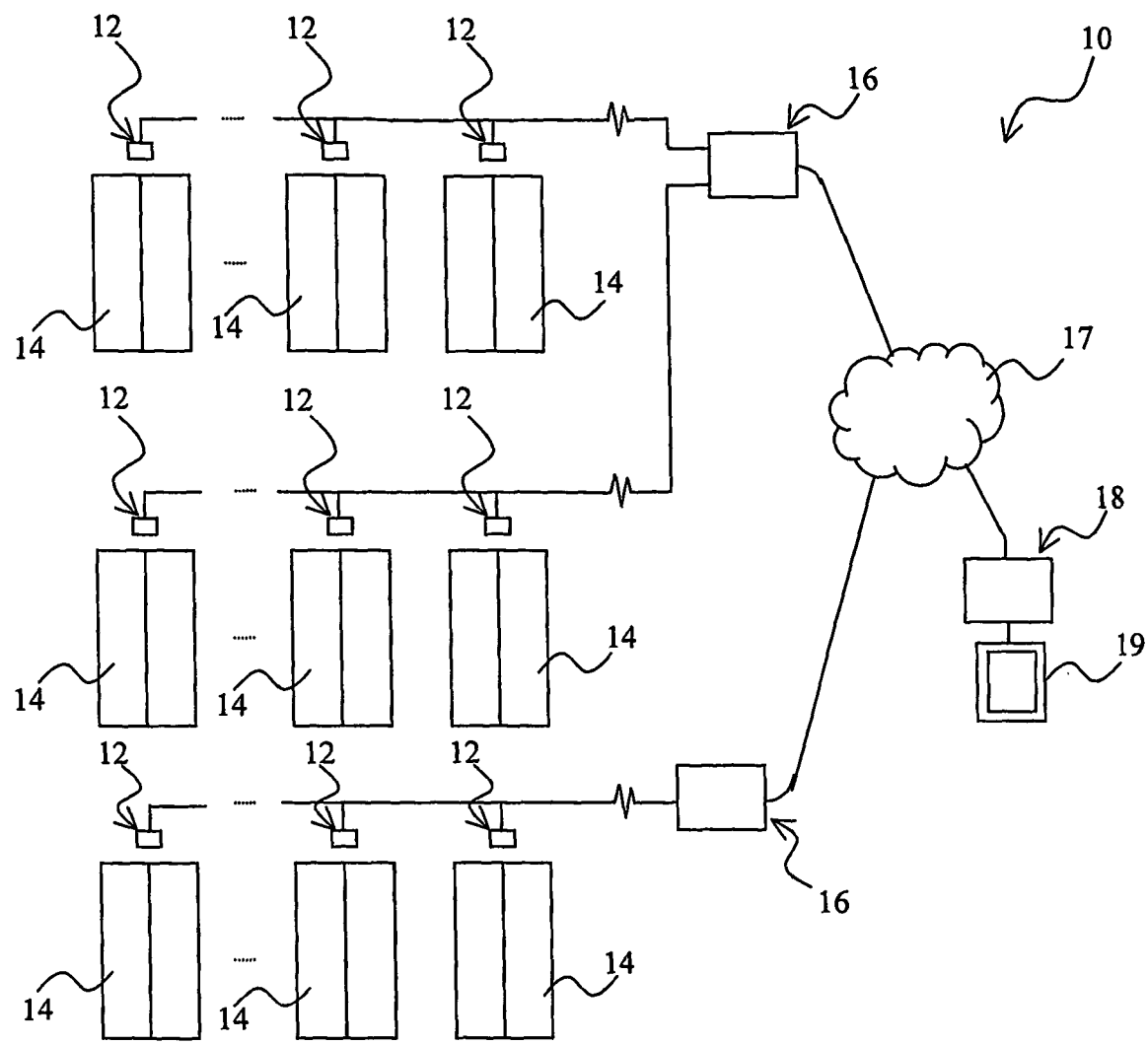
FIG. 1 is a schematic drawing of a system according to an embodiment of the invention.

Referring to FIG. 1, a system 10 according to an embodiment of the invention will be schematically described. The system 10 comprises a plurality of sensor arrangements 12, which each is mounted in the vicinity of a door device 14. Each sensor arrangement 12 controls opening and closing of the respective door device 14. The sensor arrangement controls opening and closing of the door device 14 by sending signals to a door control arrangement that physically controls the opening and closing of the door device 14. Each sensor arrangement 12 is further connected to a local management unit 16. Several sensor arrangements 12 may be connected to the same local management unit 16. Each sensor arrangement 12 has a unique identifier, whereby it may easily be identified in the local management unit 16.

Each sensor arrangement 12 comprises an image-acquiring means (hereinafter called image sensor) that is mounted to monitor a field of view encompassing an approach area to the door device 14. Thus, images are acquired of the approach area of the door device 14, enabling detection of a movement in front of the door device 14. The sensor arrangement 12 also comprises a movement detector that processes the acquired images in order to detect a movement in front of the door and that also trigs the sensor arrangement 12 to send an activation signal to the door control arrangement to make sure that the door is opened.

The acquiring of images also enables identification of an occurrence—event—that changes the conditions of the door device 14 or the field of view. The performance of the door device 14 or the movement detector may be impaired due to such an occurrence. Therefore, the system 10 comprises at least one event generator. The event generator processes information regarding the door device 14 and the field of view to detect events, by corresponding to predefined criteria being fulfilled. The information comprises the acquired images and may further comprise information on the position and/or speed of the door device 14. Upon detection of an event, the event generator creates a recording of the event. Such a recording may also hold important information on the history of the door device 14 and the sensor arrangement 12. It may for that reason also be of interest to record events even though the performance of the door device 14 or the movement detector is not affected by the event. The recording of an event constitutes a digital identifier of an occurrence, which in an effective manner may be distributed.

The system 10 also comprises at least one event storage for storing the above-mentioned recordings of events. These stored recordings may be handled or analyzed at a later stage for evaluating the function of a door device 14.

The local management unit 16 provides a network connection to a communication network 17 and thereby connects the sensor arrangements 12, including the image sensors and the movement detectors, to the communication network 17. This makes the sensor arrangements 12 accessible to an external computer 18 via the communication network 17 and the local management unit 16. Further, the external computer 18 may receive information from several local management units 16, thereby connecting the external computer 18 to more sensor arrangements 12, making it a central management unit.

The image sensors and/or movement detectors may be arranged to receive processing instructions from the external computer 18 via the network connection. Thus, the image sensors and movement detectors may be controlled from an external computer 18 at a remote site. The processing instructions may include an instruction set to be executed by a processor to thereby change the operation of the movement detector. In this way, the function of the movement detector may be improved from the remote site. Further, the processing instructions may bring at least one of the image sensors to acquire an image and make it accessible to the external computer 18. In this way, the situation at a door device 14 may be monitored at the remote site. The external computer 18 is connected to a display device 19 for displaying information received from the sensor arrangements 12.

The network connection may also connect the event generator to the communication network 17, thereby making the event generator accessible to the external computer 18, via the communication network 17 and the network connection. The event generator may also be arranged to receive processing instructions from the external computer 18 via the network connection. In this way, the function of the event generator may also be controlled from the remote site. The processing instructions may be used for e.g. bringing the event generator to change the predefined criteria for a given event; bringing the event generator to store predefined criteria for a new event; and bringing the event generator to store a specification of associated information to be included in the recording of a given event. Thus, the identification of events may be controlled and the information in a recording of an event may be changed.

Since events are recorded in the system 10, there is provided a possibility of handling dangerous or exceptional situations in a specific manner. A service person may use the storage of recordings of events in order to, at any time, analyse the performance of a door device 14. In this way, he may decide whether a service is needed. This analysis may be performed from an external computer 18 at a remote site, reducing travel costs for the service person. Further, the external computer 18 may, via the communication network 17, be connected to several sensor arrangements 12 and, in this way, the performance of several door devices 14 may be monitored at the same place.

The system 10 may provide possibilities to monitor the operation of the plurality of door control arrangements; monitor the operation of the plurality of door devices; monitor the operation of the plurality of movement detectors; monitor the operation of the plurality of image sensors; log at least part of the recordings; and process at least part of the recordings.

Further, it is possible to change the performance of the movement detector and event generator from a remote site. Thus, a service person may first monitor the performance of a sensor arrangement 12 at the remote site and then make adjustments to the settings of the sensor arrangement 12 to improve its function. Thereby, a service may be performed from the remote site.

In the following, the details of the system 10 according to a presently preferred embodiment will be described. According to this embodiment, each sensor arrangement comprises an event generator. In this way, recordings of events are made in the sensor arrangement 12 at the door device where the event occurred. Thus, the sensor arrangement 12 in this embodiment is an intelligent sensor unit.

Figure 2:
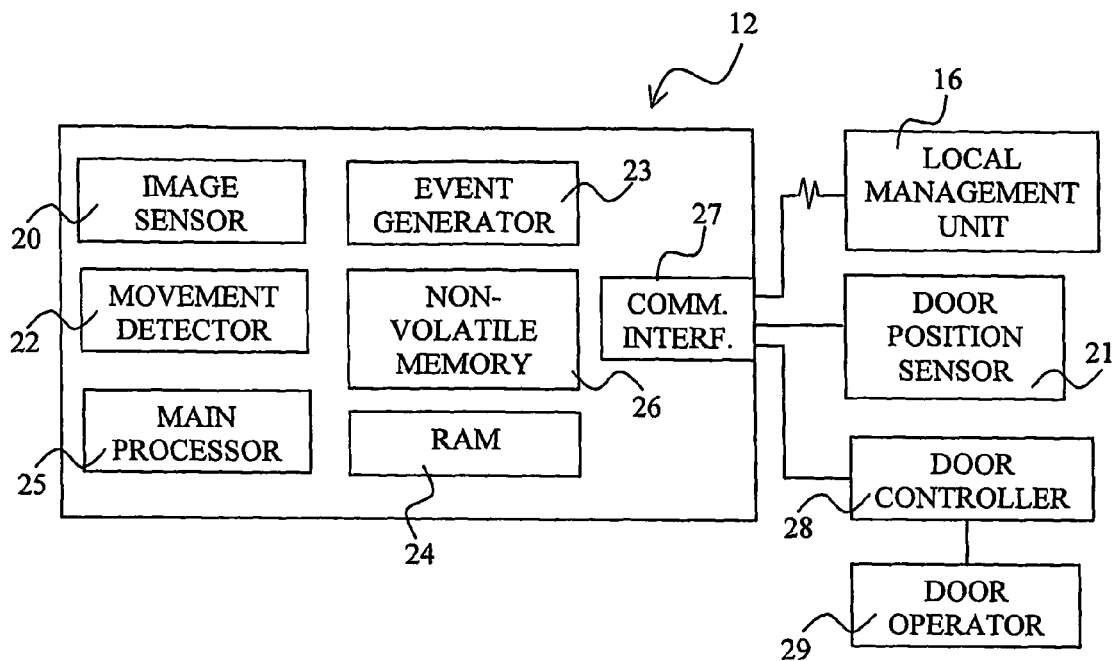
FIG. 2 is a block diagram of a sensor arrangement according to the invention.

Referring now to FIG. 2, an intelligent sensor unit 12 will be described in more detail. The intelligent sensor unit 12 comprises an image sensor 20 that is mounted to monitor a field of view encompassing an approach area to the door device 14. The intelligent sensor unit 12 may include two image sensors 20 that are mounted side by side to partly monitor the same area of a doorway of the door device 14. The image sensor 20 may be a CCD (Charge Coupled Device)- or CMOS (Complementary Metal Oxide Semiconductor)-sensor with an associated lens arrangement.

The intelligent sensor unit may also receive information from a door position sensor 21. The door position sensor 21 may be an optical sensor mounted on a motor shaft driving the opening and closing of the door device 14. The door position sensor 21 then measures the rotation speed of the motor shaft, which may be converted to speed and position of the door. The intelligent sensor unit 12 comprises a communication interface 27, which receives the information from the door position sensor 21.

The intelligent sensor unit 12 further comprises a movement detector 22 which receives the images acquired by the image sensor 20. The movement detector 22 will process the acquired images to detect a movement in the field of view corresponding to a person approaching the door. If such a movement is detected, the intelligent sensor unit 12 will transmit a signal via the communication interface 27 to a door controller 28. This signal will trig the door controller to control the operation of a door operator 29 to open the door or prevent the door from closing. The movement detector 22 may also detect if there is a person present in the doorway and then disable opening and closing of the door 14.

The field of view may be divided into zones, where the movement detector 22 should be sensitive to a movement of a person approaching the door 14, or to the presence of a person in the doorway. The movement detector 22 may use images from two image sensors 20 with at least partially overlapping fields of view in order to detect the presence of a person in the doorway. Based on this stereoscopic detection, the movement detector 22 is able to determine the 3D-shape of an object in the doorway in order to evaluate whether a person is present in the doorway.

The movement detector 22 compares sequential images of the field of view in order to detect a movement. Thus, when the movement detector 22 discovers a difference between an acquired image and the previously acquired image, the movement detector 22 will evaluate the difference. In this way, it will be decided whether the door 14 should be opened or closed or if some other action is needed. Further, the movement detector 22 will use a reference image to be compared to the acquired images in order to detect the presence of a person in the doorway.

The intelligent sensor unit 12 further comprises an event generator 23. The event generator 23 receives the acquired images and the information obtained by the door position sensor 21 regarding the door speed and position. The event generator 23 will identify events according to predefined criteria. For this purpose, the event generator 23 in the sensor arrangement 12 processes the acquired images and the information from the door position sensor 21 in order to detect the occurrence of an event. The event generator 23 will then record events. The recording will be time-stamped and comprises information about the event. The recording of an event will notify personnel and provides useful information about the sensor unit 12 or the door device environment. The sensor arrangement will, via the communication interface 27, transmit a signal, which holds the recording of the event to the local management unit 16. The local management unit 16 may store the recording of the event in an event storage and/or forward the recording via the communication network 17 to an external computer 18.

The image sensor 20 will continuously acquire images of the field of view, typically at a rate of 5 images per second. Thus, in stored movies the image rate will be approximately 5 images per second. The rate varies depending on the light conditions in the field of view, the activity in the field of view, etc. These images are received by the event generator 23, which continuously evaluates the images in order to detect if an event has occurred. Thus, the event generator 23 processes the images to discover if the predefined criteria of any event are met.

The latest acquired images are temporarily buffered in the intelligent sensor unit 12. This implies that when an event is identified, the recording of the event may include a few images acquired before the event was identified. As a result, a recording of an event may comprise a movie, which shows the field of view from a few seconds before the occurrence triggering the recording of an event takes place to a few seconds after it takes place. Thus, the process causing the event to be identified may be recorded.

There will be a delay between the identifying of the start of an event until the event may be presented on a display connected to the local management unit 16. The delay may depend on the image format, such as still image or movie, resolution, and compression, and on the amount of existing communication between the sensor units 12 and the local management unit 16. The delay may typically be 15-60 seconds. The longest delays occur when a movie is to be recorded. In these cases, a still image may at first be transmitted to the local management unit 16. Thus, the still image may be presented on a display before the movie is received by the local management unit 16 and the whole recording is able to be presented. Typically, the still image delay is 15-30 seconds.

The intelligent sensor unit 12 also comprises a main processor 25 controlling the operation of all parts of the intelligent sensor unit 12. Further, the movement detector 22, the event generator 23, and the main processor 25 may be implemented as processes performed in one or more commercially available microprocessors, such as a CPU (Central Processing Unit) or other programmable logic units, such as a FPGA (Field-Programmable Gate Array), or alternatively as one or more ASICs (Application-Specified Integrated Circuit). The main processor performs advanced image processing on the acquired images. The acquired images may temporarily be stored in a RAM (Random Access Memory) 24. The sensor unit 12 further comprises a non-volatile memory 26 holding, i.a., computation codes, and event definitions (predefined criteria and specifications of associated information)

If the recordings cannot be transmitted as fast as they are created in the intelligent sensor unit 12, the events will be buffered in the intelligent sensor unit 12. The intelligent sensor unit 12 may use the RAM 24 for buffering events. Typically, the RAM 24 has a storage capacity for 25 still images and 7 movies of 5 seconds. The intelligent sensor unit 12 may also store recordings of specific events, which will be described below, in the non-volatile memory 26.

As mentioned, the intelligent sensor unit 12 also comprises a communication interface 27. The communication interface 27 is arranged to transmit data from the intelligent sensor unit 12 to the local management unit 16. The intelligent sensor unit 12 may transmit data to the local management unit 16 of its own volition or may transmit data in response to a request from the local management unit 16. The communication interface 27 may also receive data from the local management unit 16. The communication interface 27 is also arranged to transmit an activation signal to a door controller 28, which regulates the operation of a door operator 29 that opens and closes the door device 14. The communication interface 27 may also receive information from the door controller 28, e.g. regarding the opening/closing status or speed of the door device 14.

All components of the intelligent sensor unit 12 may be integrated on one printed circuit card. This makes the intelligent sensor unit 12 stable, i.e. it is less sensitive to interferences and it has fewer points on which sabotage or malfunctions may occur.

The provision of an intelligent sensor unit 12 reduces the amount of data to be transmitted, since the acquired images may be processed within the sensor unit, before a decision is taken whether the images should be forwarded over a data network.

Figure 3:
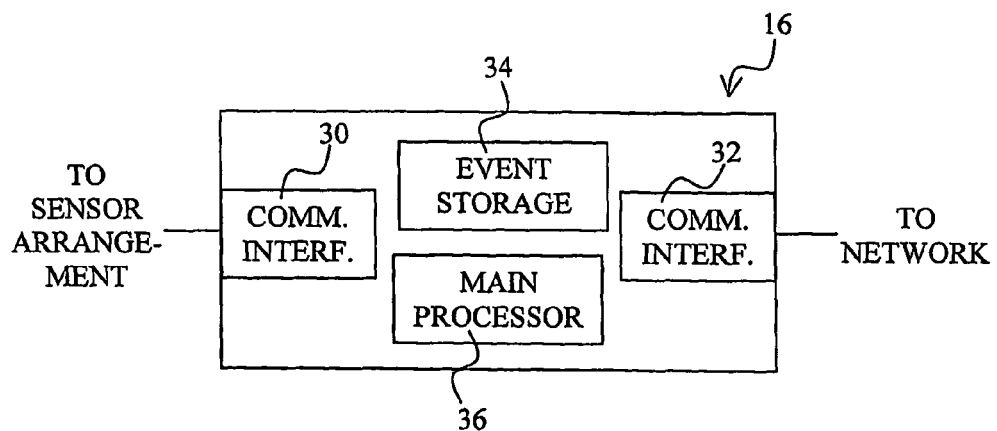
FIG. 3 is a block diagram of a local management unit of the system in FIG. 1.

Referring now to FIG. 3, the local management unit 16 will be described. The local management unit 16 communicates with the intelligent sensor unit 12 via a communication interface 30. The local management unit 16 may be mounted in in-door environment, e.g. in a reception. Further, the local management unit 16 may comprise an output for an analogue TV signal. Thus, it is possible to connect the local management unit 16 to a TV for display or a video for storing events on videotape. Further, the local management unit 16 may comprise an analogue VGA (Video Graphics Array) output for a PC monitor. The local management unit 16 may also comprise an input for mouse and keyboard for enabling user interaction.

The local management unit 16 may also be connected via another communication interface 32 to a communication network 17, such as a local area network or a public communication network, such as the Internet. Further, the local management unit 16 may support wireless connection to a data network.

The local management unit 16 may then communicate over the communication network 17 for forwarding data received from the intelligent sensor units 12. The local management unit 16 may also receive data through the communication network 17 or receive a request for data. The local management unit 16 may send an e-mail to a specific address in response to receiving specific information from the intelligent sensor unit 12. Further, it may be possible to control the local management unit 16 from a remote site. Thus, maintenance or a function check may be made by a service person, without requiring that he actually visits the place of the door device 14. Further, the set-up may be changed or software be upgraded from the remote site.

The local management unit 16 may also comprise a USB (Universal Serial Bus)-connection for firmware upgrading. The system 10 may require that the USB-connection is used in order to allow changes to the set-up of the system 10. Thus, it is ensured that only authorised and qualified persons make important changes to the system 10.

The local management unit 16 may be a computer unit, such as a PC or a unit specifically designed for its function. Preferably, it is a specifically designed unit, whereby the local management unit 16 may be small and well adapted to its purpose. The local management unit 16 may in this case simply function as a network panel connecting intelligent sensor units 12 to a communication network 17. In its simplest form, the network panel may be a simple network connection unit, which provides a wired or wireless access to a computer, telephone or satellite communications network. For example, the network panel may include a modem, an ISDN (Integrated Services Digital Network) adapter, a WLAN (Wireless Local Area Network) adapter, a GSM (Global System for Mobile communication) or UMTS (Universal Mobile Telecommunications Service) transceiver, etc. However, the local management unit 16 may comprise an event storage 34 in the form of a non-volatile memory, which typically has a storage capacity of 3000 still images and 500 movies of 5 seconds acquired by the intelligent sensor units 12. The event storage 34 will be used for storing events recorded by the intelligent sensor units 12 connected to the local management unit 16. If the event storage 34 is full and new events should occur, the new events shall be stored and the oldest be erased.

The local management unit 16 also comprises a main processor 36 for managing the operation of the event storage 34 and the communication interfaces 30, 32.

Figure 4:
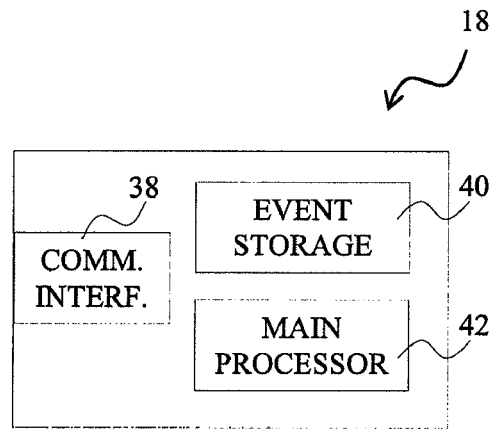
FIG. 4 is a schematic view of a central management unit of the system in FIG. 1.

Referring now to FIG. 4, the main features of the external computer 18 will be described. The external computer 18 comprises a communication interface 38 for communicating with the local management units 16 via the communication network 17. The external computer 18 may further comprise an event storage 40 for storing recordings of events. The external computer 18 is connected to a display device 19 (FIG. 1) for displaying information on the recordings of events. Further, the external computer comprises a main processor 42 for managing the operation of the event storage 40 and the communication interface 38.

In the following, the events that the intelligent sensor units 12 may identify will be described. A recording of an event will comprise time and date stamp when the event occurred and the unique identifier of the intelligent sensor unit 12 recording the event to give the location where the event occurred. The recording will further comprise specific information about the event. This specific information varies depending on the type of event. For most events, the recording will include at least one image of the field of view illustrating the situation at the door device 14.

Firstly, referring to Table 1 below, events that may be identified by the intelligent sensor units 12 are listed. Thereafter, a more thorough description of each event will be given.

TABLE 1

List of events

| Detection parameter | Event | Event ID | Associated data | Special sensor unit instructions |
|---|---|---|---|---|
| Set-up completed signal | Set-up completed | 1 | Images, Zone pattern, Parameters | Store event |
| Distorted image | Image failure | 2 | Time, Movies | Store event, Shut off other functions |
| Shift in background objects | Zone shift | 3 | Time, Images | Store event, Shut off other functions |
| Change of background | Auto adapt | 4 | Time, Image | |
| Duration of door activation | Continuous door hold open | 5 | Time, Movie | |
| Object in zone | After hours surveillance | 6 | Time, Movie | |
| Door speed | Closing speed violation | 7 | Time, Movie, Speed data | |
| Testing signal | Automatic door check | 8 | Time, Status, Statistics, Set-up | |
| Start up | Start up | 9 | Time | Retrieve current time data |
| Number of door activations | Relay activation count | 10 | Time, Number | Send notification to maintenance |
| Time | Maintenance reminder | 11 | Time | Send notification to maintenance |

The intelligent sensor unit 12 will identify when a set-up has been completed. This may be identified by the event generator 23 detecting that a given configuration process has been completed in the image sensor 20 and/or movement detector 22. The recording of a set-up completed event (Event ID: 1) will contain a still image of the field of view of the image sensor, a still image of the field of view taken when the set-up is started, this still image depicting the person making the set-up, the set-up zone pattern, in which detection of movement is enabled, and specified parameters of the set-up. The latest recording of a set-up event will also be stored in the non-volatile memory 26 of the intelligent sensor unit 12.

Since all set-up events are stored in the local management unit 16, the installer of the intelligent sensor unit 12 will be able to prove that a correct set-up has been made. This may be useful if an accident occurs or if the door device 14 does not function properly. The person making a set-up may be forced to identify himself before making a set-up. As a result, there is a possibility to check who has made an incorrect set-up. Further, the person making the set-up is depicted when the set-up is started. Moreover, if a user finds out that the set-up is wrong, the user may restore an old, correct set-up. The intelligent sensor unit 12 will then be updated. Thus, there is no need for redoing the set-up completely.

Figure 5:
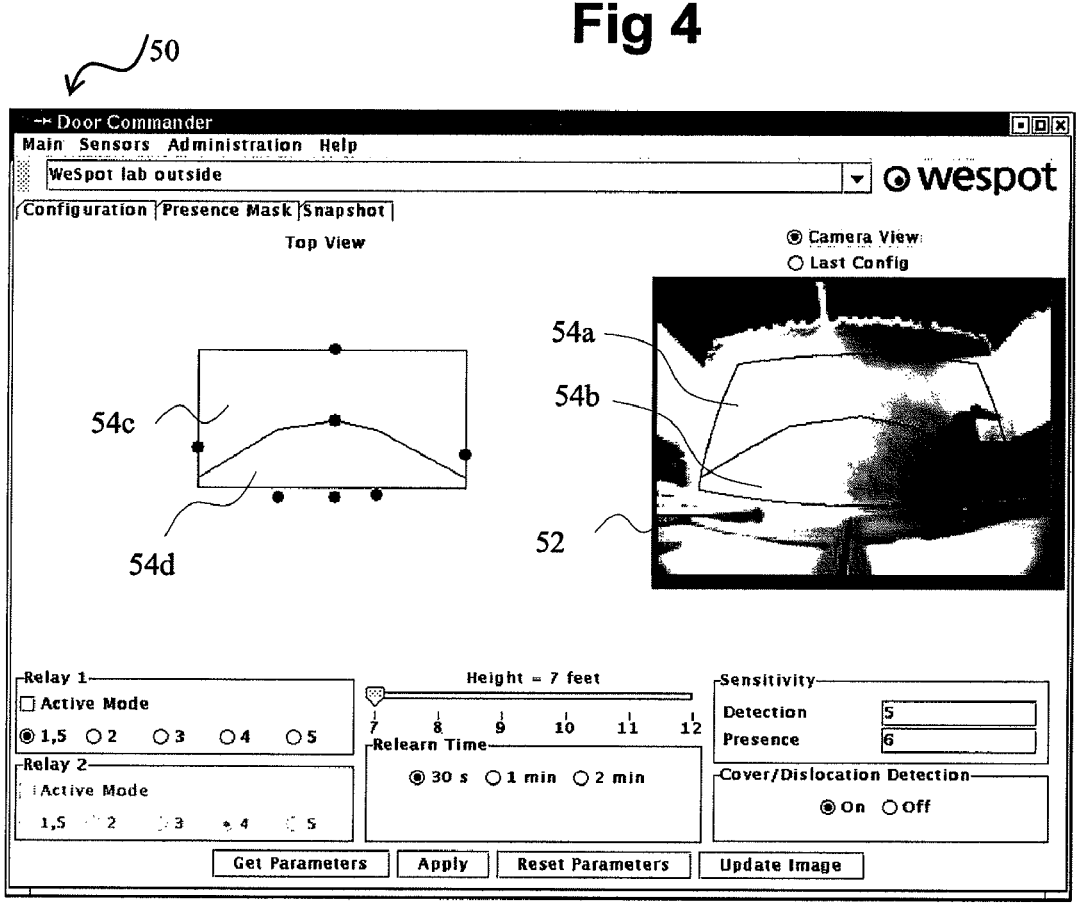
FIGS. 5-6 are views of a screen showing user interaction for making a set-up of a sensor arrangement.
Figure 6:
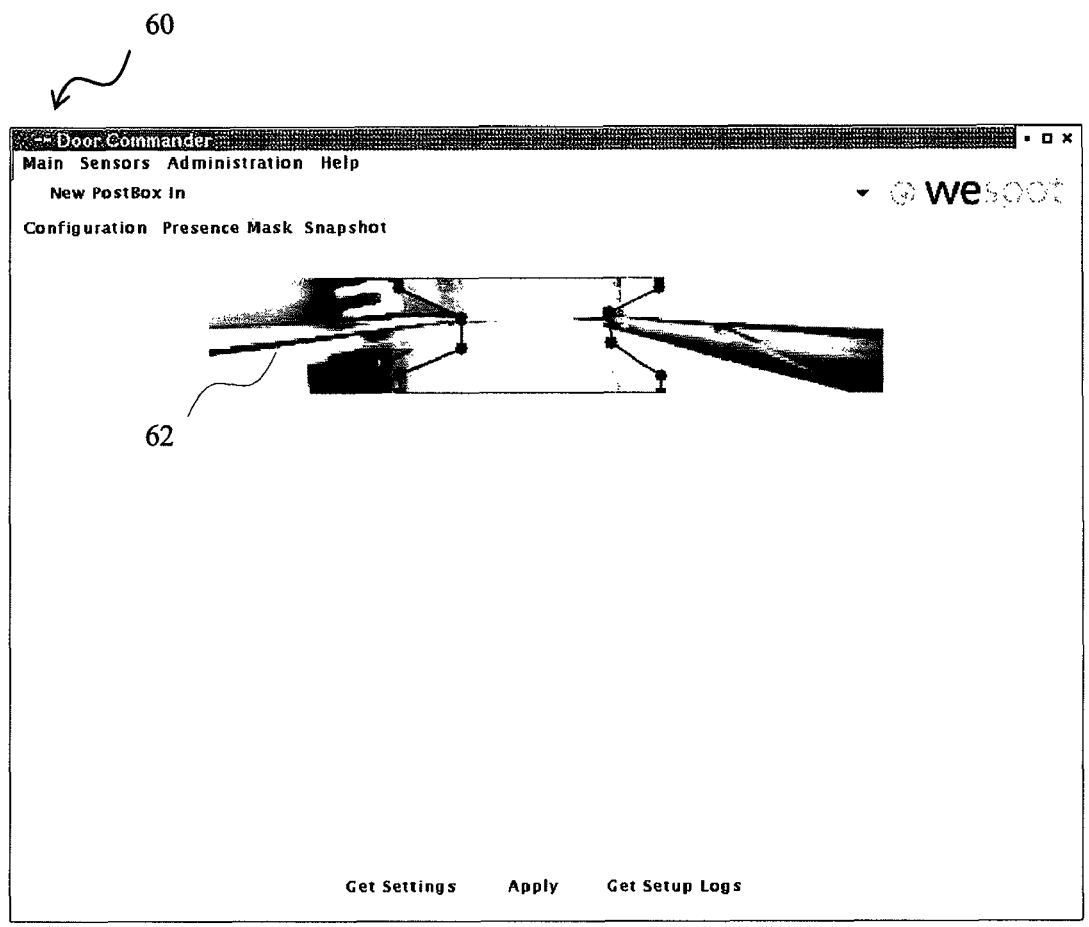

Referring to FIGS. 5-6, the set-up of the intelligent sensor unit 12 will be described. FIG. 5 shows a view of a screen 50 presenting an interactive program for setting up the intelligent sensor unit 12. The field of view of the image sensor 20 is shown at 52, and detection zones 54 are marked in the field of view. The areas of the detection zones 54*a*, 54*b*, 54*c*, 54*d* may be changed and the sensitivity in each zone may be set.

Further the height of the image sensor 20 above the ground is specified at 56 to facilitate image analysis. Referring to FIG. 6, which shows a view of a screen 60, a doorway zone may be specified at 62. A detection of the presence of a foreign object within this doorway zone should prevent opening and closing of the door device 14. In order to enable evaluating a 3D-shape of an object in this doorway zone, the presence detection may use two image sensors 20, one mounted on each side of the door device 14. This ensures that a change of e.g. a mat in the doorway zone will not trig a presence detection.

Further, the intelligent sensor unit 12 will identify an image failure event (Event ID: 2). The event generator 23 will detect when the acquired image becomes distorted or substantially differs from a reference image and as a response the event generator 23 will create a recording of an image failure event. The image failure event could e.g. be caused by the image sensor 20 being covered or the lens arrangement being damaged. The recording of an image failure event will firstly comprise a movie of 1-2 seconds when detected and then a further movie of 1-2 seconds when attended to. The latest recording of an image failure event will be stored in the non-volatile memory 26 of the intelligent sensor unit 12. When an image failure event is identified, all other functions of the intelligent sensor unit 12 will be shut off until the image failure is attended to. This ensures that the door device 14 will not be controlled by a malfunctioning intelligent sensor unit 12.

When the image sensor 20 in some way has been tilted or turned, the event generator 23 will identify a zone shift event (Event ID: 3). By comparing the acquired images to a reference image, the event generator 23 will detect when the background objects are no longer imaged in the same image positions. Thus, a zone shift event is identified when the event generator 23 detects that an acquired image differs from a reference image by a displacement of at least one common background object. The recording of a zone shift event will firstly comprise a still image of the field of view according to the set-up, and a still image of the field of view at the time the zone shift event is detected, the still images having the detection zone pattern marked. Moreover, the recording of a zone shift event will also comprise a still image of the field of view according to a new set-up taking care of the zone shift event, and a current still image of the field of view when the zone shift event has been attended to, the still images having the detection zone pattern marked. The current still image will then confirm that the zone according to the set-up corresponds to the zone being monitored. The latest recording of a zone shift event will also be stored in the non-volatile memory 26 of the intelligent sensor unit 12. When a zone shift event is identified, all other functions of the intelligent sensor unit 12 will be shut off until the zone shift is attended to. This ensures that the door device 14 will not be controlled by a malfunctioning intelligent sensor unit 12.

The intelligent sensor unit 12 will detect if the background in the field of view is changed. For example, the position of a potted plant or a trashcan could be changed in the field of view. The intelligent sensor unit 12 will then adapt to the changed field of view by creating a new reference image. The new reference image will then be used for the purpose of presence detection. The event generator 23 will detect that an image has been stored as a reference image and, in response, record an auto adapt event (Event ID: 4). The recording of the auto adapt event comprises a still image of the new background.

The auto adapt event must not be triggered by a person standing still in the field of view. Thus, the auto adapt event is not triggered until an identical background has been observed for quite a long period of time, such as several hours.

When the door 14 has been held open continuously for a long time period exceeding a predetermined time limit, a continuous door hold open event is recorded (Event ID: 5). This event may be caused by a heavy traffic through the doorway forcing the door to be open continuously for a long time. This should of course be allowed. The recording of this event may notify an operator that he should check that there is no problem at the doorway, such as a person or an object standing in, or in the vicinity of, the doorway, thus preventing the door 14 from being closed. The event is recorded when a configurable time period has been exceeded by analysing the activation signal from the movement detector 22 to the door controller 28. Thus, the activation signal is presumed to reflect the status of the door device 14. Alternatively, the event may be identified based on feedback data from the door position sensor 21. The time period may typically be adjusted to 2, 5, or 10 minutes. The recording of the event will comprise a movie of 5 seconds of the field of view.

The opening and closing of the door device 14 may be disabled at certain times. For example, an entrance door to an office building may be disabled after working hours. The intelligent sensor unit 12 may function as a surveillance device at after hours. Thus, the movement detector 22 is controllable between a door sensor operating mode, in which it provides the activation signal to the door control arrangement for opening the door, and a surveillance operating mode, in which the activation signal is disabled. After hours may be specified in the local management unit 16 to adapt the intelligent sensor unit 12 to weekends and holidays. In the surveillance operating mode, the event generator 23 may process the acquired images with respect to predefined alarm criteria, and create a recording of an alarm event (Event ID: 6) if these alarm criteria are met. These predefined alarm criteria may constitute a movement or presence detection corresponding to a person in the field of view. The recording comprises a movie of 5 seconds.

If the door 14 closes too fast, a door closing speed violation event occurs (Event ID: 7). The allowed speed may be specified. In case of slide doors, the allowed speed may typically be 1 ft/s. The speed of the closing door may be calculated using information from end position sensors giving the time in which the door was brought from a first end position of being fully open to a second end position of being fully closed. Alternatively, the speed of the closing door is calculated using the information from the door position sensor 21. The door closing speed violation event is recorded whenever the event generator 23 detects that the closing speed of the door device 14 exceeds a predetermined limit. The recording of this event will comprise a movie of 5 seconds showing the closing of the door 14. A check of the door closing speed violation event may be made every time the door is closed. Alternatively, this check may only be made at regular intervals, e.g. in an automatic regular door check.

At regular intervals, an automatic regular door check is made that the door 14 is opened correctly. This could be made daily, preferably at the time the opening and closing of the door device 14 is enabled, e.g. at the end of each after hours surveillance period. The intelligent sensor unit 12 will check that the door opens correctly. The event generator 23 will generate a recording of an automatic door check event (Event ID: 8), when it detects that the movement detector 22 has executed a testing process, which includes providing the activation signal to the door control arrangement and testing the subsequent operation of the door control arrangement. The recording of the automatic door check event comprises status of the opening of the door 14, some statistics, such as number of times the door 14 has been opened since the last day, and the last valid set-up.

Every time the intelligent sensor unit 12 starts up, a start up event (Event ID: 9) is created. The event generator 23 identifies this event by detecting that the image sensor 20 and/or the movement detector 22 has been restarted. The start up event is an internal event within the system 10. The event triggers the local management unit 16 to provide the intelligent sensor unit 12 with specific information, such as time, date, etc. The intelligent sensor unit 12 will make a start up after power failures. Further, if the system 10 goes out of order it will make a restart. Then, a recording of a start up event is created.

When the door device 14 has been opened a certain, predefined number of times, a relay activation count event (Event ID: 10) is identified by the event generator 23. The recording of the relay activation count event comprises statistics regarding the number of times that the door device 14 has been opened. A notification of the recording may be sent automatically via e.g. e-mail to a maintenance firm, giving a reminder that it is time for servicing the door device 14. The event generator 23 may count the number of times the relay controlling opening and closing of the door has been activated, based on the activation signal from the movement sensor 21, or based on feedback data received from the door position sensor 21. When a specified number of relay activations have occurred, the event generator 23 creates a recording of the relay activation count event.

The system 10 may also create a maintenance reminder event (Event ID: 11). By setting a date when the next maintenance of the system 10 is to be made, the system 10 will create the maintenance reminder event on the specified date. Thus, the event generator 23 creates the event, when it detects that a current date meets a predefined date. The maintenance reminder event creates an e-mail that is distributed to the maintenance firm. Thus, the firm will get a reminder that it is time to visit the location of the system 10 to perform regular servicing. After the service to the system 10 has been made, a new next maintenance date may be set, which will create a new maintenance reminder event.

The handling of recordings of events will now be described, with reference to FIGS. 7-12, showing the presentation of the events on a monitor connected to the local management unit 16 or to the external computer 18.

The local management unit 16 and/or the external computer 18 comprises software for handling the recordings of events. The software may adjust, receive, store, display, and forward events.

When using the software, a menu bar will always be displayed. The menu bar will make it possible to choose a specific intelligent sensor unit 12 in the network, change assigned names of an intelligent sensor unit 12, get a still image from an intelligent sensor unit 12 to view its location, find help instructions for the software, etc.

Figure 7:
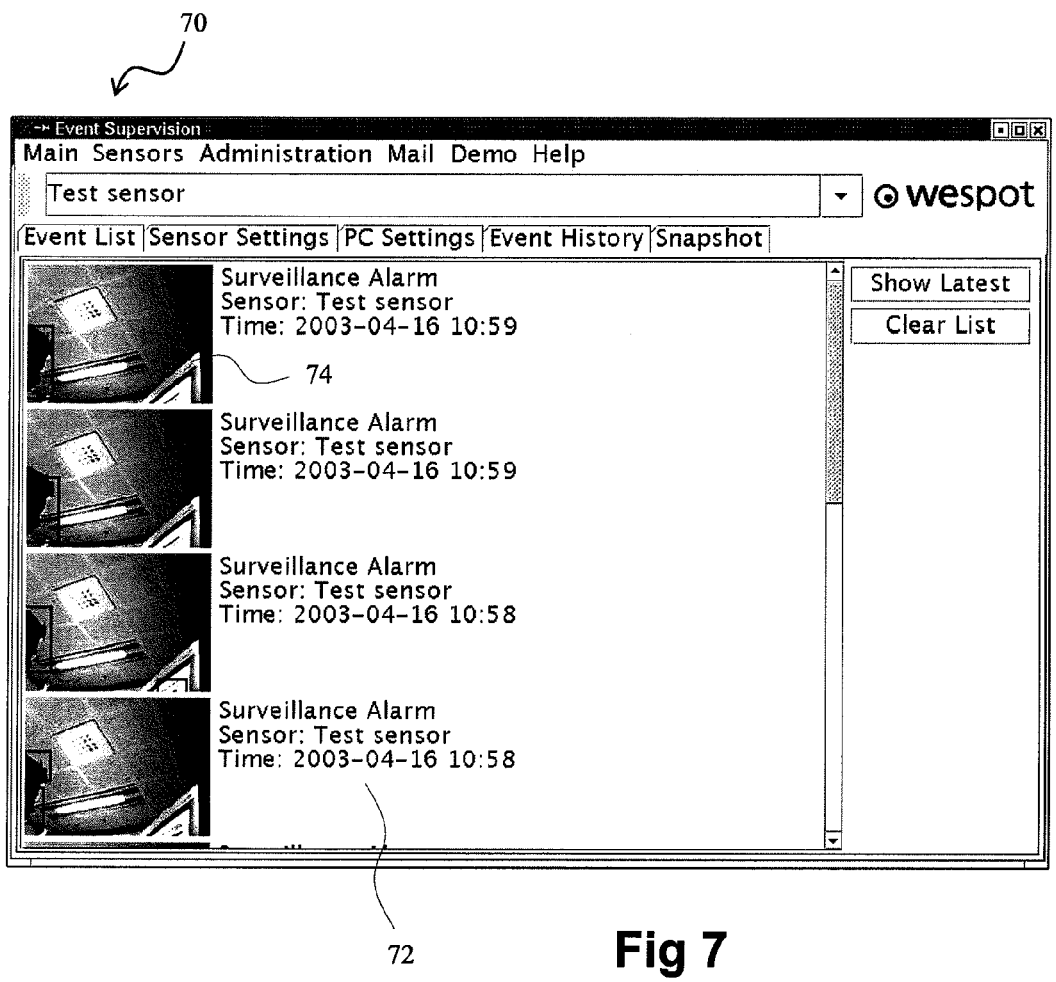
FIGS. 7-10 are views of a screen presenting information of events recorded by a sensor arrangement.

The recordings of the events may be displayed in a few different manners. Referring to FIG. 7, which shows a view of a screen 70, the latest recordings of events may be indicated in an event list 72. Typically, the 10 latest recordings of events are listed as thumbnails 74. New recordings will be listed at the top of the event list. Recordings that have not been viewed in detail will be highlighted in the event list. A recording in the event list will be presented with a still image, the type of the event, the identity of the intelligent sensor unit 12 that recorded the event, and the time and date of the event.

All information of a recording may be displayed in a specific window. The recording may be accessed by clicking on a thumbnail in the event list. If the event contains a movie, the movie will be played. The display window will contain buttons for playing, pausing and rewinding the movie.

The software can be set to an auto-play mode. In this mode, the software will in a specific window automatically display the newest event, when it is received by the local management unit 16 and/or the external computer 18. The event will be displayed until next event occurs or the window is deleted manually.

Figure 8:
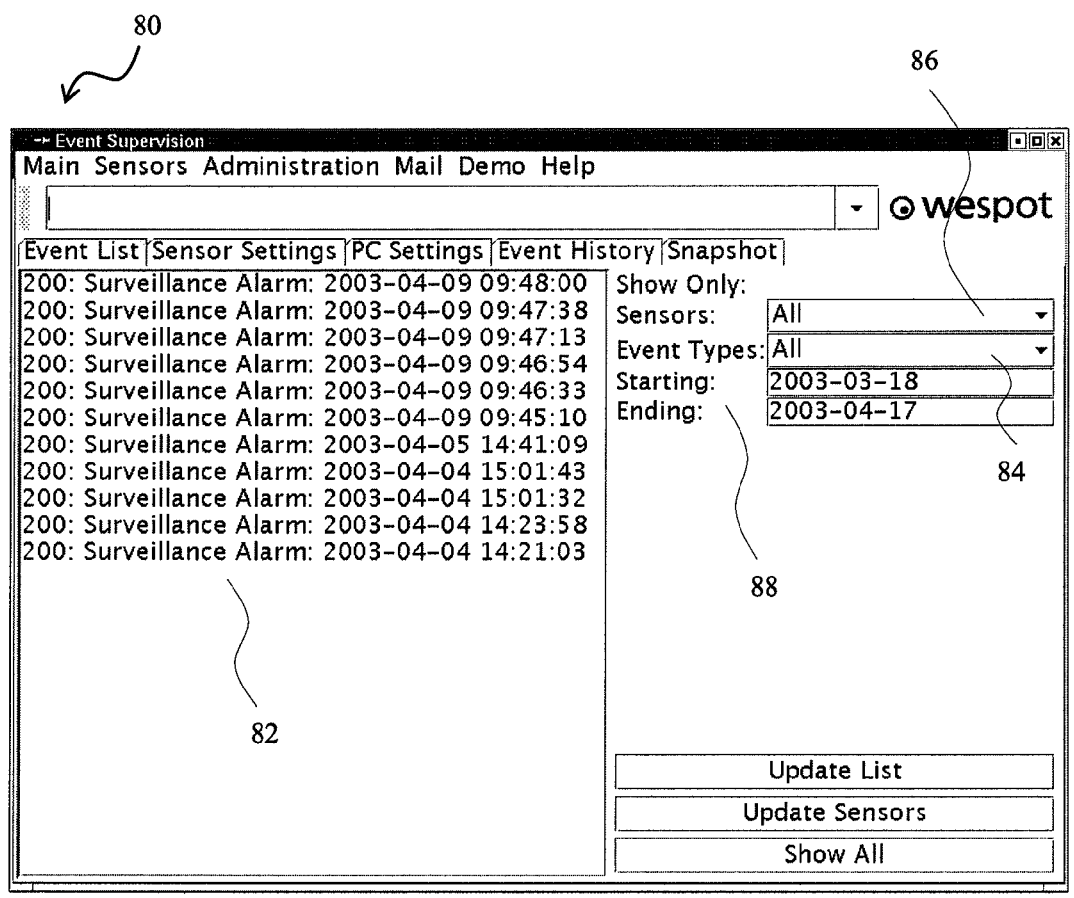

Referring to FIG. 8 which shows a view of a screen 80, old recordings may be listed in an event history 82. There is a possibility to at 84 define the types of events to be listed, at 86 define the intelligent sensor unit 12 that created the recordings of the events, or at 88 define a time interval of occurrences of the events.

Figure 9:
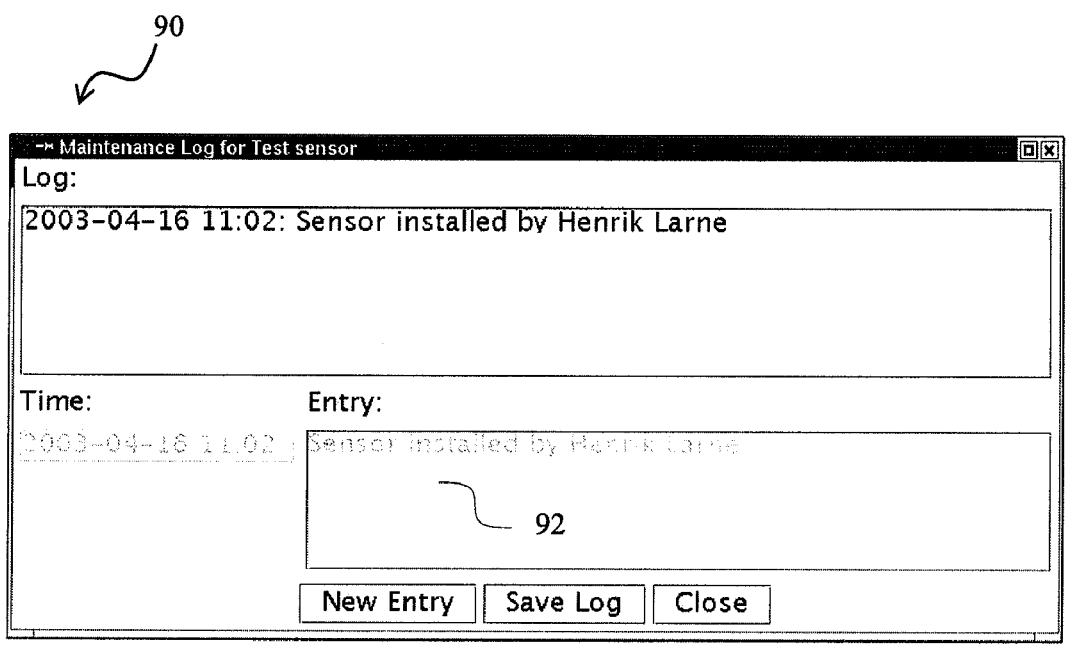

Referring to FIG. 9 which shows a view of a screen 90, there is a possibility to at 92 add comments to a recording of an event. Thus, further information about the event may be added, such as the name of a person who has made a set-up.

Figure 10:
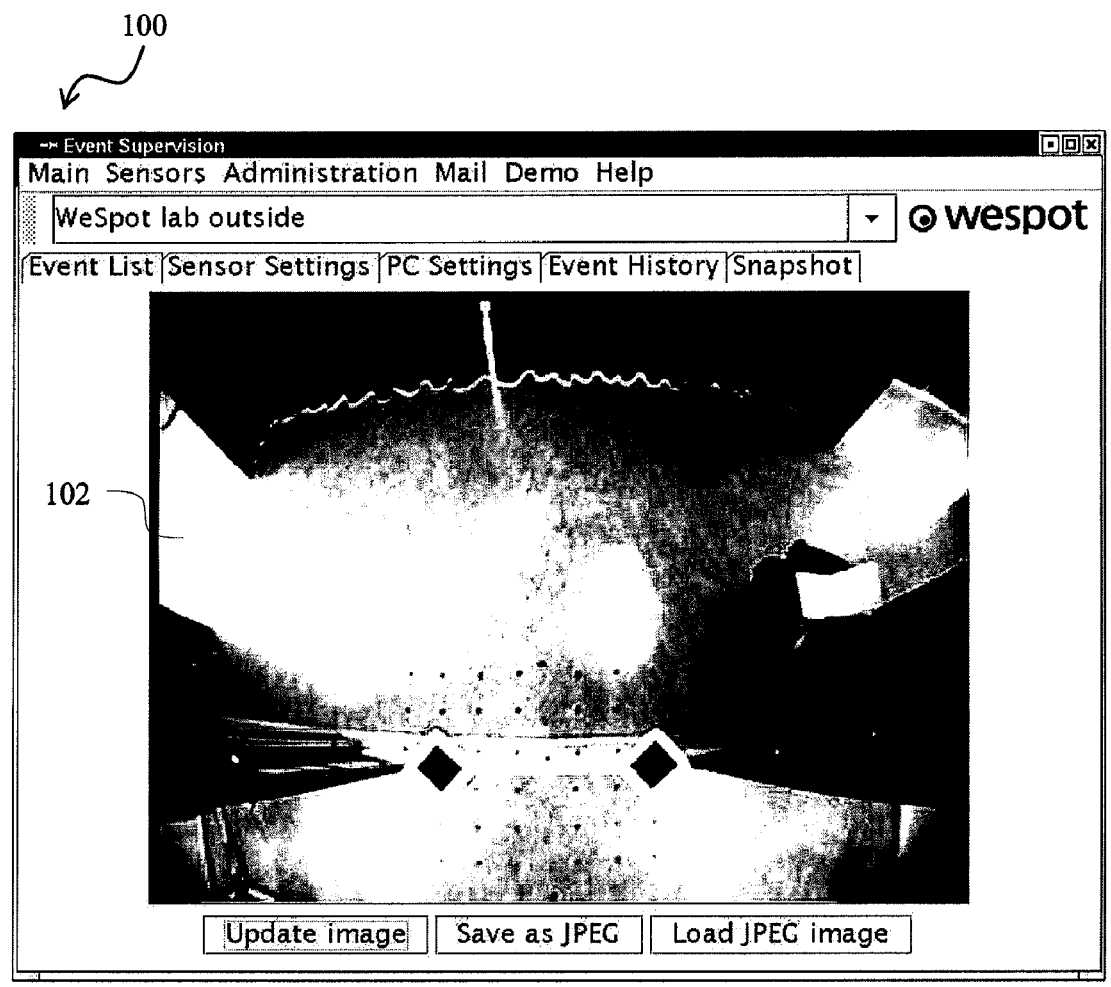

Referring to FIG. 10 which shows a view of a screen 100, it is possible to at 102 force a snapshot to be acquired of the field of view. As a result, it is possible to examine the field of view at any time. This could be used by maintenance staff in order to view the door device 14 from a remote site. Thus, the maintenance staff may analyse and attend to problems of the function of the door device 14 from the remote site.

Figure 11:
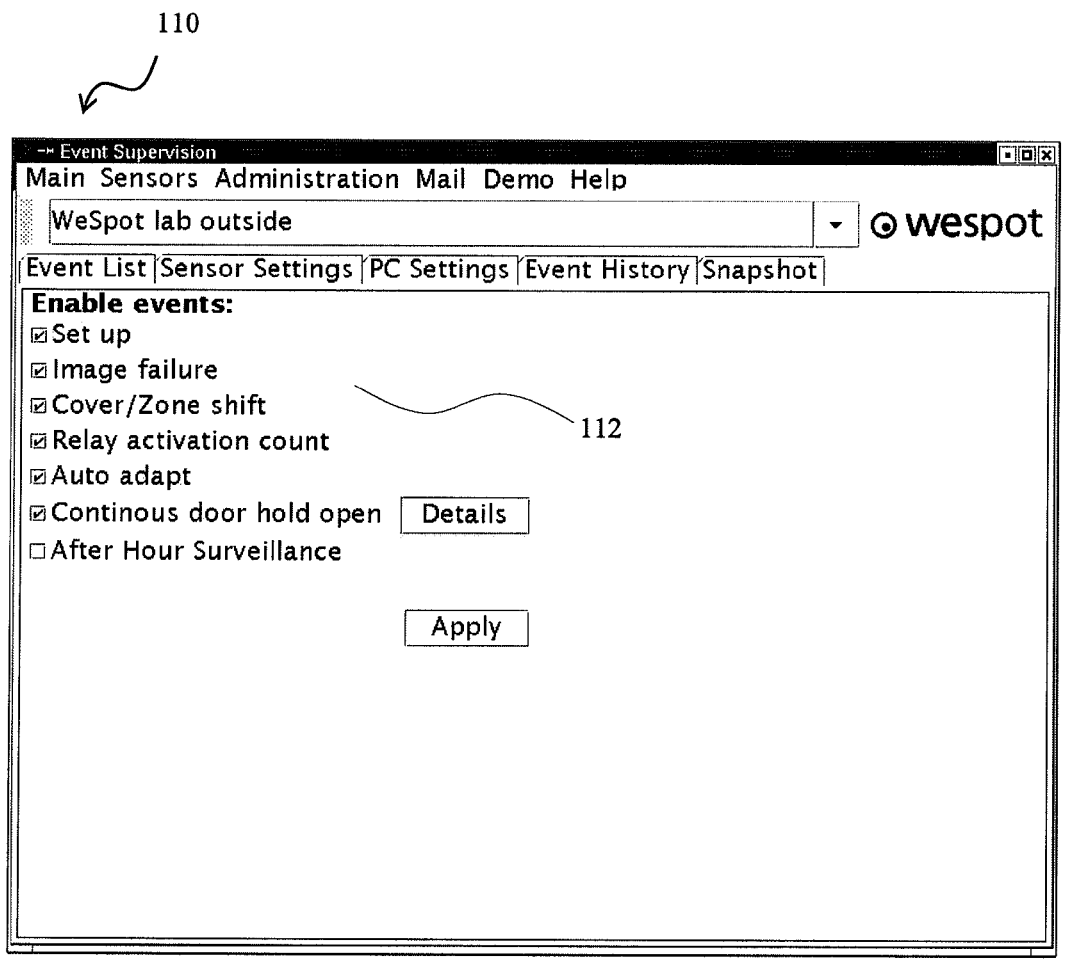
FIGS. 11-12 are views of a screen showing user interaction for configuring handling of events.
Figure 12:
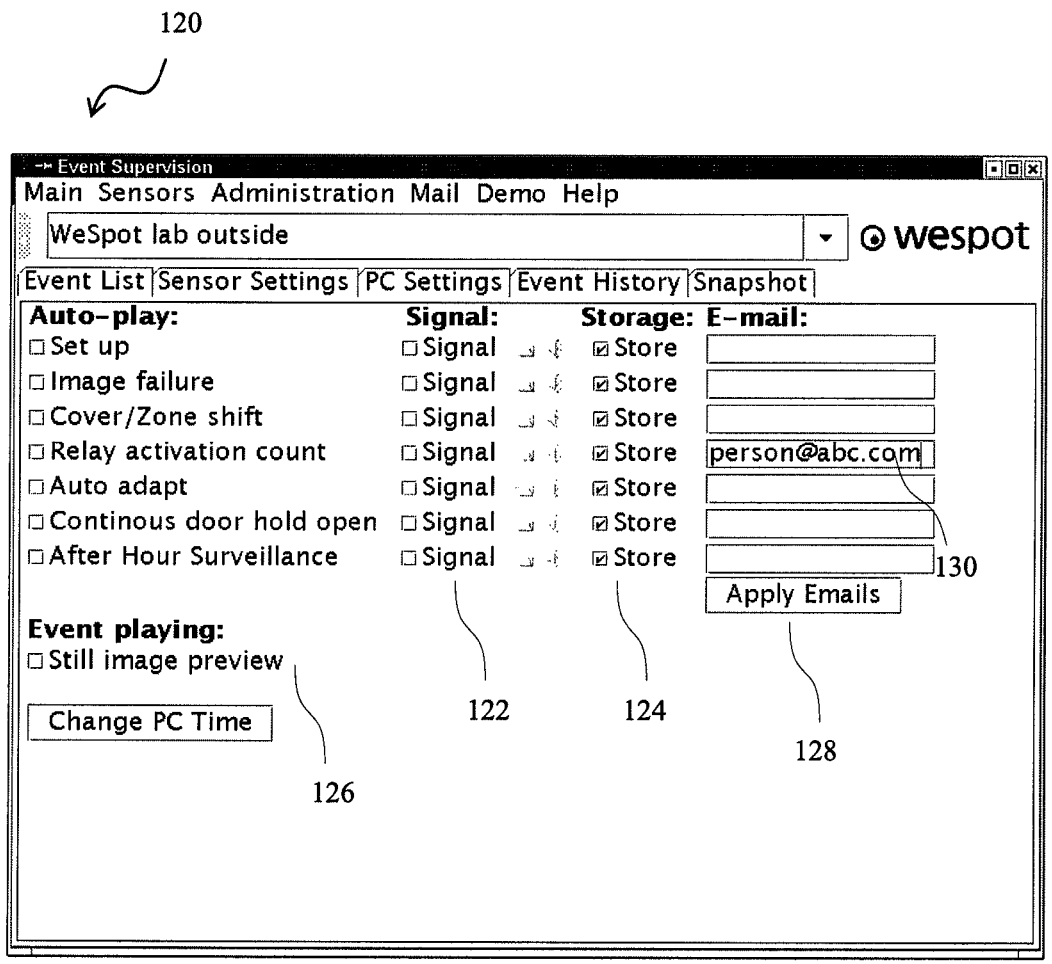

Referring to FIGS. 11-12, the software also provides a configuration possibility. It is possible to configure the function of the event generator 23, e.g. what events should be identified and setting parameters that will trig the identification of an event. It is also possible to configure the function of the local management unit 16, e.g. how a recording of an event should be handled. Thus, as shown in FIG. 11 which shows a view of a screen 110 showing user interaction, it is possible to set a configuration of which types of events, generally shown at 112, the intelligent sensor units 12 should record and also to set the time limit for the identification of a continuous door hold open event. Further, as shown in FIG. 12 which shows a view of a screen 120 showing user interaction, it is also possible to change the settings of time and date in the local management unit 16, choose different acoustic signals 122 for different events, choose whether the recordings of a type of events should be stored, 124 choose whether an event should be presented 126 as a still image before a movie may be presented, choose whether an e-mail 128 regarding specific events should be sent and in such case to what e-mail address 130 the recording of the event should be sent. In addition to the settings shown in FIG. 12, it may also be possible to choose whether the recordings of a type of event should be forwarded from the local management unit 16 to the external computer 18.

By making recordings of events the system 10 provides improved security of the door system. Thus, the security is improved for people walking through the door. The door owners know how their doors perform and may control the doors easily and from a remote site. There is a possibility of keeping track of possibly hostile movements during after hours using the intelligent sensor unit 12 for surveillance.

Figure 13:
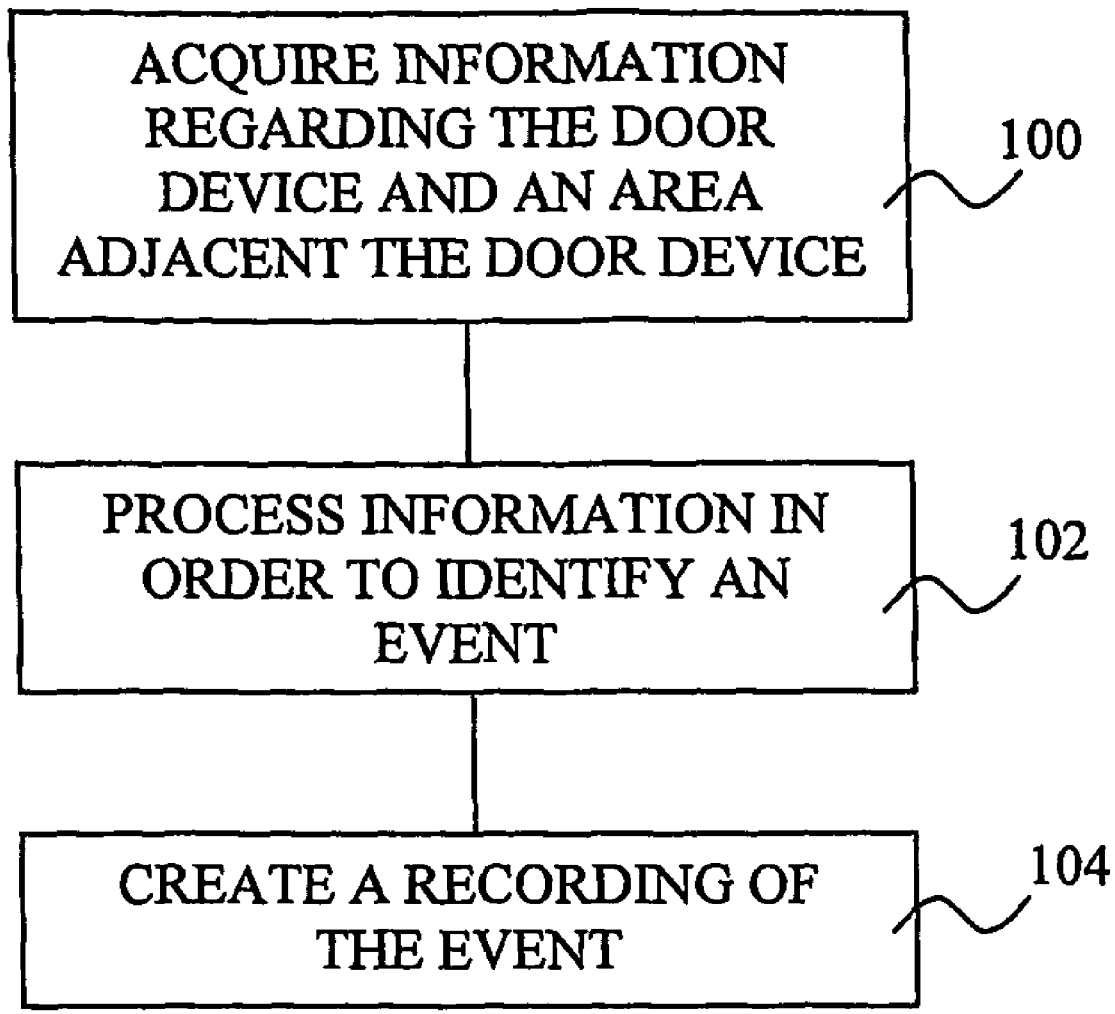
FIG. 13 is a flow chart of a method according to the invention.

Referring now to FIG. 13, a method for recording events in the intelligent sensor unit 12 will be described. The intelligent sensor unit 12 will acquire information regarding the door device 14 and an area adjacent the door device 14, step 100. The intelligent sensor unit 12 acquires information by the image sensor 20 obtaining images of a field of view adjacent the door device 14. The intelligent sensor unit 12 further acquires information from a door position sensor 21 and/or a door controller 28 detecting speed and position of the door device 14. Next, the information is processed in order to identify at least one event, step 102. Thus, the information is compared to predefined criteria, and if these are met, an event is identified. Different criteria are specified for different events. Further, in response to an identification of an event, a recording of the event is created, step 104. The recording of the event may be transmitted to a local management unit 16 for further handling. Recordings of critical events may also be stored in the intelligent sensor unit 12. The intelligent sensor unit 12 will continuously acquire information of the current status of the door device 14 and the area adjacent the door device 14. Further, this information will continuously be processed to identify events when they occur.

It should be emphasized that the embodiments described herein are in no way limiting and that many alternative embodiments or modifications are possible within the scope of protection defined by the appended claims.

Above, the system 10 has been described as having sensor arrangements 12, each including an event generator 23 for creating recordings of events. Further, each sensor arrangement 12 has a non-volatile memory 26 in which certain events may be stored. The recordings are also sent to a local management unit 16, where all recordings are stored in an event storage 34. However, each sensor arrangement 12 may also include the event storage. Thus, the local management unit 16 may merely function as a network connection for connecting the sensor arrangement 12 to an external computer 18. In this case, there will be no need for an event storage in the local management unit. It is also conceivable to exclude the local management unit, by providing each sensor arrangement with a suitable interface for network communication with the external computer.

According to another alternative, the event storage is located at the external computer 18, whereby no event storage may be needed at either the sensor arrangement or the local management unit. In this case, the logging of recordings of events is made at the external computer 18.

According to a further alternative, the sensor arrangement 12 need not comprise the event generator. In this case, the local management unit 16 comprises the event generator, whereby the recordings of events are created at the local management unit 16. If the local management unit is connected to a plurality of sensor arrangements 12, the event generator in the local management unit 16 may handle events occurring at all the door devices 14 corresponding to the plurality of sensor arrangements 12 and create recordings of these events.

Further, the function of the door device 14 may be monitored via the local management unit 16 and/or via the external computer 18. Also, the configuration of the sensor arrangements 12 may be performed via the local management unit 16 and/or via the external computer 18.

Still further, the local management unit 16 or the external computer 18 may be configured as a web server, which may provide access to, i.a., the event storage, the event generator and the movement detector from a suitable web client. It is even conceivable to incorporate an event storage in each intelligent sensor unit and configure each sensor unit as a web server, to thereby provide direct access to each sensor unit via a web client in an external computer.

As an alternative to the unitary construction of the intelligent sensor unit, the sensor arrangement may be formed as an assembly of separate components. For example, the image sensor may be a separate component in the sensor arrangement. Additionally or alternatively, the movement detector and/or the event generator may be such a separate component.

The invention claimed is:

1. A sensor arrangement for controlling opening and closing of a door device, said sensor arrangement being arranged to be mounted in a vicinity of the door device, said sensor arrangement comprising
 an image-acquiring means, which is arranged to be mounted in a viewing position wherein said image-acquiring means monitors a field of view that encompasses at least an approach area located adjacent said door device, said image-acquiring means being adapted to acquire images of said field of view,
 a movement detector, which is arranged to receive said acquired images and which is arranged to process the received images in order to detect a movement, which is to result in an opening of the door device, and
 an event generator, which is arranged to receive information regarding said door device and said field of view, said information comprising said acquired images, said event generator being arranged to process said information in order to identify at least one event according to predetermined criteria, said at least one event pertaining to exceptional situations excluded from normal operation of said sensor arrangement, said exceptional situations being defined by said predetermined criteria, wherein the event generator creates a permanent recording of the event in response to an identification of the event, and wherein the event generator creates a temporarily buffered recording during normal operation of said sensor arrangement.

2. The sensor arrangement according to claim 1, wherein the sensor arrangement is a unitary structure.

3. The sensor arrangement according to claim 1, wherein said event generator is arranged to receive information from a door position sensor regarding position and/or speed of said door device.

4. The sensor arrangement according to claim 1, wherein said recording includes associated information regarding said event, wherein a predefined specification determines what associated information is to be included in a recording.

5. The sensor arrangement according to claim 4, wherein said recording includes at least one image of said field of view.

6. The sensor arrangement according to claim 1, wherein the at least one event to be identified by the event generator includes at least one event that permanently changes the settings of said field of view that is monitored by the image-acquiring means.

7. The sensor arrangement according to claim 1, wherein said event generator is arranged to process the received images in order to identify a plurality of different events according to different predetermined criteria.

8. The sensor arrangement according to claim 1, further comprising a communication unit, which is arranged to transmit said recording of the event over a data network to which the sensor arrangement is connected.

9. A sensor arrangement for controlling opening and closing of a door device, said sensor arrangement being arranged to be mounted in a vicinity of the door device, said sensor arrangement comprising
 an image-acquiring means, which is arranged to be mounted in a viewing position wherein said image-acquiring means monitors a field of view that encompasses at least an approach area located adjacent said door device, said image-acquiring means being adapted to acquire images of said field of view, and
 an event generator, which is arranged to process information regarding said door device and said field of view in order to identify at least one event according to predetermined criteria, said at least one event pertaining to exceptional situations excluded from normal operation of said sensor arrangement, said exceptional situations being defined by said predetermined criteria, wherein the event generator creates a permanent recording of the event only in response to an identification of the event, said recording comprising at least one image of the field of view, and wherein the event generator creates a temporarily buffered recording during normal operation of said sensor arrangement.

* * * * *